Figure 1:
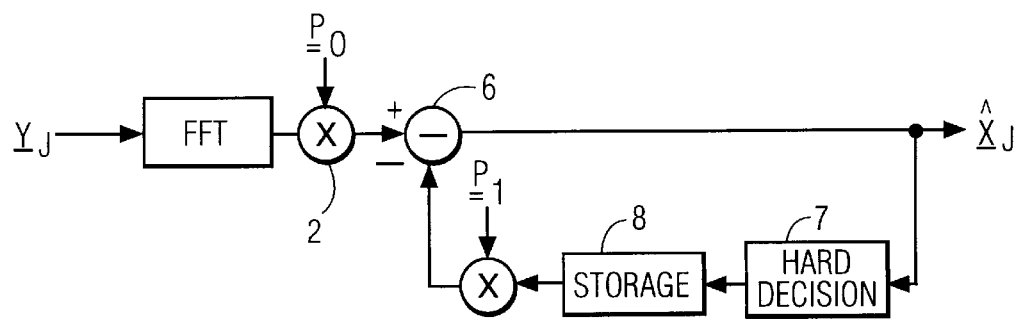

United States Patent
Demoulin et al.

[11] Patent Number: 6,061,327
[45] Date of Patent: May 9, 2000

[54] DEVICE AND METHOD FOR VECTOR EQUALIZATION OF AN OFDM SIGNAL

[75] Inventors: Vincent Demoulin, Pleumeleuc; Michel Pecot, Thorigné-Fouillard, both of France

[73] Assignee: Thomson Licensing S.A., Boulogne Cedex, France

[21] Appl. No.: 08/941,624

[22] Filed: Sep. 30, 1997

[30] Foreign Application Priority Data

Sep. 30, 1996 [DE] Germany ............................. 96 115 50

[51] Int. Cl.⁷ .................................................. H04J 11/00
[52] U.S. Cl. .......................................... 370/208; 375/233
[58] Field of Search ................................. 370/203, 208, 370/210, 206, 207; 375/200, 229, 231, 232, 233, 234, 235

[56] References Cited

U.S. PATENT DOCUMENTS

| | | | |
|---|---|---|---|
| 4,027,258 | 5/1977 | Perreault | 333/18 |
| 5,175,747 | 12/1992 | Murakami | 375/232 |
| 5,243,624 | 9/1993 | Paik et al. | 375/232 |
| 5,268,930 | 12/1993 | Sendyk et al. | 375/231 |
| 5,448,590 | 9/1995 | Kostic | 375/232 |
| 5,483,529 | 1/1996 | Baggen et al. | 370/484 |
| 5,487,085 | 1/1996 | Wong-Lam et al. | 375/230 |
| 5,506,836 | 4/1996 | Ikeda et al. | 370/203 |
| 5,559,830 | 9/1996 | Dapper et al. | 375/230 |
| 5,608,764 | 3/1997 | Sugita et al. | 375/344 |
| 5,682,376 | 10/1997 | Hayashino et al. | 370/206 |

FOREIGN PATENT DOCUMENTS

| | | |
|---|---|---|
| 0499 560 A1 | 1/1992 | European Pat. Off. . |
| 0734 133 A1 | 9/1996 | European Pat. Off. . |

OTHER PUBLICATIONS

Copy of Search Report IEEE Globecom. Communications Theory., Nov. 28, 1994–Dec. 2, 1994, San Francisco, USA OV.D. Wiel and L. Vanderdorpe: A comparison of bidimensional RLS and LMS equalizers for OFDM/DS transmission in an indoor environment.

Personal Communication—Freedom Through Wireless Technology, Secaucus, NJ. May 18–20, 1993—Institute of Electrical and Electronics Engineers, pp. 649–652; Mohamed siala et al: Equalization for Orthogonal Freq.

IEEE Journal on Selected Areas in Communications vol. 14 No. 3, Apr. 1, 1996, pp. 502–511—Vandendorpe L et al: Mimo DFE equalization for multitone DS/SS Systems Over Multipath Channels.

Wireless Personal COmmunications vol. 2 No. 1/02, Jan 1, 1995—Vanendorpe L et al: Performance Analysis of Linear Mimo Equalizers for Multitone DS/SS Systems in Multipath Channels.

IEEE Transactions on Communications, vol. 44, No. 1, Jan. 1, 1996, pp. 56–64—Al–Dhahir N et al: Optimum Finite–Length Equalization for Multicarrier Transceivers—p. 57.

Primary Examiner—Ajit Patel
Assistant Examiner—Bob A. Phunkulh
Attorney, Agent, or Firm—Joseph S. Tripoli; Eric P. Herrman; Ronald H. Kurdyla

[57] ABSTRACT

The present invention belongs to the field of transmission of a signal, using OFDM modulation (Orthogonal Frequency Division Multiplexing), from a transmitter to at least one receiver, via a transmission channel. The invention relates in particular to a device and a method for equalization of the received OFDM signal. Said equalization device is fitted into the reception system between a synchronization module and a module for binary decoding of the received signal, in which the receiver includes a recursive vector equalizer (10) capable of correcting the received signal in the time domain.

According to the invention, the recursive vector equalizer (10) includes computation means (16; 22; 24; 40; 44; 46; 56) capable of estimating each transmitted symbol as a function of an estimate of the transmitted symbol which precedes the said transmitted symbol.

6 Claims, 1 Drawing Sheet

DEVICE AND METHOD FOR VECTOR EQUALIZATION OF AN OFDM SIGNAL

DESCRIPTION

The present invention relates to a device for transmitting an OFDM signal (Orthogonal Frequency Division Multiplexing) from a transmitter to at least one receiver, via a transmission channel. The invention relates in particular to a device and a method for equalization of the received OFDM signal, in which the receiver includes a recursive vector equalizer capable of correcting the received signal in the time domain. Said equalization device is fitted into the reception system between a synchronization module and a module for binary decoding of the received signal.

An OFDM signal is generated, in a manner known per se, by decomposition of the signal to be transmitted over a basis of orthogonal functions, constituting a plurality of sub-carriers, each carrying a complex sample of a plurality of samples obtained by constellation coding of the signal to be transmitted. An IDFT (Inverse Discrete Fourier Transform,) is applied to each packet so as to obtain a set of OFDM symbols, each composed of N digital samples representing the N complex values, N being an integer. Each symbol is represented by a vector of N components.

A transmission channel is completely defined by its impulse response. The latter can be digitized, the channel then being represented by a set of complex values $\{h_n\}$. Representing by $\{x_n\}$ the set of digital samples present at the input of the transmission channel, and by $\{y_n\}$ the set of digital samples present at the output of the transmission channel, the $i^{th}$ digital sample present at the output of the channel is given by the following equation:

$$y_i = \sum_{n=-\infty}^{-\infty} h_n x_{i-n} \tag{E1}$$

Equation (E1) can be written in a matrix form, as follows:

$$\underline{y}_i = \sum_{n=-\infty}^{-\infty} \underline{H}_n \underline{x}_{i-n} \tag{E2}$$

$x_i$ and $y_i$ respectively represent the $i^{th}$ vector of the set $\{x_n\}$ of vectors of dimension N which represents the signal present at the input of the transmission channel, and the $i^{th}$ vector of the set $\{y_n\}$ of vectors of dimension N which represents the signal at the output of the transmission channel. The $k^{th}$ component of the vector $x_i$ is the digital sample $x_{iN+k}$, k lying between 0 and N−1. Similarly, the $k^{th}$ component of the vector $y_i$ is the digital sample $y_{iN+k}$. $H_i$ represents the $i^{th}$ matrix of the set $\{H_n\}$ of the matrices of dimensions N×N which represents the transmission channel. The element lying on the $l^{th}$ row and on the $k^{th}$ column of $H_i$ is $h_{iN+l-k}$, l and k lying between 0 and N−1.

The transmission channels encountered in reality have a causal impulse response. This property is expressed on the set $\{h_n\}$ by $h_i=0$ if i<0. Furthermore, we make the very realistic assumption that the longest echo delay is less than the duration of an OFDM signal. This assumption is expressed on the set $\{h_n\}$ by $h_i=0$ if i>N−1. The causality of the transmission channel and the assumption made on its length are expressed on the set of matrices $\{H_n\}$ by $H_i=0$ if i≠0 and i≠1.

During communication on a Gaussian channel (transmission channel such that $h_0=1$, $h_i=0$ if i≠0, and with no perturbation other than Gaussian white noise), the orthogonality of the sub-carriers is preserved. Therefore, in order to recover the transmitted signal in the receiver, it is sufficient to take a DFT (Discrete Fourier Transform) of the received signal after having correctly synchronized it in time and divided it into packets of N samples. Conversely, during transmission on a multipath-type channel (transmission channel containing echoes), the appearance of interference between the OFDM symbols is observed. In this case, the received signal is the weighted sum of a plurality of signals corresponding to the transmitted signal having been attenuated and retarded. Each of these signals originates from the various paths followed between the transmitter and receiver by the transmitted signal. The interference between the OFDM symbols leads to loss of the orthogonality between the sub-carriers and consequently to perturbation of the transmitted information.

A plurality of solutions have been proposed in order to solve this problem. The one most commonly employed consists in inserting a guard interval in front of each symbol, the duration of which interval must be greater than the longest echo delay present on the transmission channel. The complex samples contained in this interval are identical to those which constitute the end of the OFDM symbol which follows. Since an OFDM symbol is perturbed only by the content of the guard interval which precedes it, the appearance of interference between the symbols is thus avoided. The orthogonality of the sub-carriers is consequently preserved.

Although this solution leads to a receiver whose design is not complex, needing only a Fourier transform and N scalar operations to estimate a transmitted symbol on the basis of a received symbol, it nevertheless leads to a reduction in the spectral efficiency of the transmission device, in so far as inserting a guard interval between the OFDM symbols reduces the number of symbols transmitted per unit time.

Another known solution consists in correcting, in the frequency domain the effects of the channel on the transmitted signal. This solution leads to an equalizer which is very complex to implement. Specifically, representing by $Y_{j,k}$ the $k^{th}$ component of the vector representing the received symbol, by $\hat{X}_{j,k}$ a first estimated value of the $k^{th}$ component of the vector representing the $j^{th}$ transmitted symbol, and by $\tilde{X}_{j,k}$ a second estimated value of this component, resulting from a hard decision consisting in finding the point in the constellation closest to $\hat{X}_{j,k}$, the estimated value $\hat{X}_{j,k}$ is given by the following equation:

$$\hat{X}_{j,k} = \sum_{m=0}^{N-1} p_0^{m,k} \cdot Y_{j,m} + \sum_{m=0}^{N-1} p_1^{m,k} \cdot \tilde{X}_{j-1,m} \tag{E3}$$

the $p_i^{m,k}$ represent the equalization coefficients which need to be estimated dynamically in order to follow the variations of the transmission channel.

Expression (E3) can be expressed vectorially in the form:

$$\hat{\underline{X}}_j = \underline{P}_0 \underline{Y}_j + \underline{P}_1 \tilde{\underline{X}}_{j-1} \tag{E4}$$

where $\underline{P}_0$ and $\underline{P}_1$ represent the matrices formed by the coefficients $p_i^{m,k}$ (i=0, 1). A structural diagram of a device of this type is given by FIG. 1, in which the received symbols are firstly applied to the input of a module for computing the Fourier transform (FFT), the output of which is connected to a first input of a multiplier 2 having a second input connected to an estimator (not shown) of the matrix $\underline{P}_0$. The output of the multiplier 2 is connected to a first input of an adder 6 whose second input is connected to an estimator (not shown) of the matrix $\underline{P}_1$. The output of the adder 6 is connected via a feedback loop to a hard decision module 7 connected in series with a storage element 8. The matrices $\underline{P}_0$ and $\underline{P}_1$ can be optimized in terms of two criteria. The first criterion is that of the minimum mean square error (MMSE) making it possible to obtain the following matrices:

$$\begin{cases} \underline{P}_0^{MMSE} = \sigma_x^2 \cdot \underline{C}_{DFT} \underline{H}_0^H \underline{R}^{-1} \underline{C}_{DFT}^{-1} \\ \underline{P}_1^{MMSE} = \sigma_x^2 \cdot \underline{C}_{DFT} \underline{H}_0^H \underline{R}^{-1} \underline{H}_1 \underline{C}_{DFT}^{-1} \end{cases} \quad (E5)$$

where $$\underline{R} = \sigma_x^2 \cdot \underline{H}_{0=0}\underline{H}^H + diag(\sigma_k^2) \quad (E6)$$

$$\underline{C}_{=DFT}$$

is a matrix of dimensions N×N, representing the discrete Fourier transform, $\sigma_x^2$ and $\sigma_k^2$ respectively represent the power of the transmitted signal and the power of the noise on the $k^{th}$ carrier of the OFDM signal The second criterion is that of zero forcing, making it possible to obtain the following matrices:

$$\begin{cases} \underline{P}_0^{ZF} = \underline{C}_{DFT} \underline{H}_0^{-1} \underline{C}_{DFT}^{-1} \\ \underline{P}_1^{ZF} = -\underline{C}_{DFT} \underline{H}_0^{-1} \underline{H}_1 \underline{C}_{DFT}^{-1} \end{cases} \quad (E7)$$

The structure resulting from these computations cannot be used directly because of the large number of coefficients $p_i^{m,k}$ to be estimated. Furthermore, these coefficients are not independent of one another.

Moreover, to correct the signal received on a carrier, it is necessary to take into account the signals received on each carrier of the OFDM signal.

The object of the invention is to overcome the drawbacks of the known devices for equalizing OFDM signals.

According to the invention, the recursive vector equalizer includes computation means capable of estimating each transmitted symbol as a function of an estimate of the transmitted symbol which precedes said transmitted symbol.

The equalizer of the invention has a particularly compact structure making it possible to simplify the method for equalizing the received signals.

The impulse response of the channel being represented by the matrix $\underline{H}_0$, of which the inverse has been previously estimated and stored, and by the matrix $\underline{H}_1$, previously estimated and stored, the method for equalizing the received signal according to the invention includes the following steps:

the vector obtained by computation of the inverse Fourier transform followed by multiplication by the matrix $\underline{H}_1$ of an estimated value of the preceding symbol is subtracted from the vector representing the received symbol.

the vector resulting from this subtraction is multiplied by the inverse of the matrix $H_0$, then the Fourier transform of the vector resulting from this multiplication is computed so as to express the corrected symbol in the original frequency domain, the symbol obtained by this Fourier transform is then used to correct the following received symbol, and finally a new estimate is computed of the coefficients of the inverse matrix of $\underline{H}_0$ and the coefficients of the matrix $\underline{H}_1$, the estimated values are stored to correct the following symbol.

The method according to the invention makes it possible to equalize the received signal without inserting a guard interval between the symbols. This makes it possible to ensure a better spectral efficiency of the transmission device in comparison with that obtained with the guard-interval method. In the case of comparison between the two methods (with and without guard interval) with a fixed spectral efficiency, the equalization without insertion of a guard interval makes is possible to use a more efficient error-correcting code.

As equalization matrices, the method according to the invention involves only the matrix $\underline{H}_0$ via its inverse, and the matrix $\underline{H}_1$. Moreover, because of the causality of the transmission channel and the assumption made on its length, $\underline{H}_0$ as well as its inverse are lower triangular matrices and $\underline{H}_1$ is an upper triangular matrix. Furthermore, $\underline{H}_0$ as well as its inverse are completely determined by their first column, and $\underline{H}_1$ is completely determined by its first row.

Figure 2:
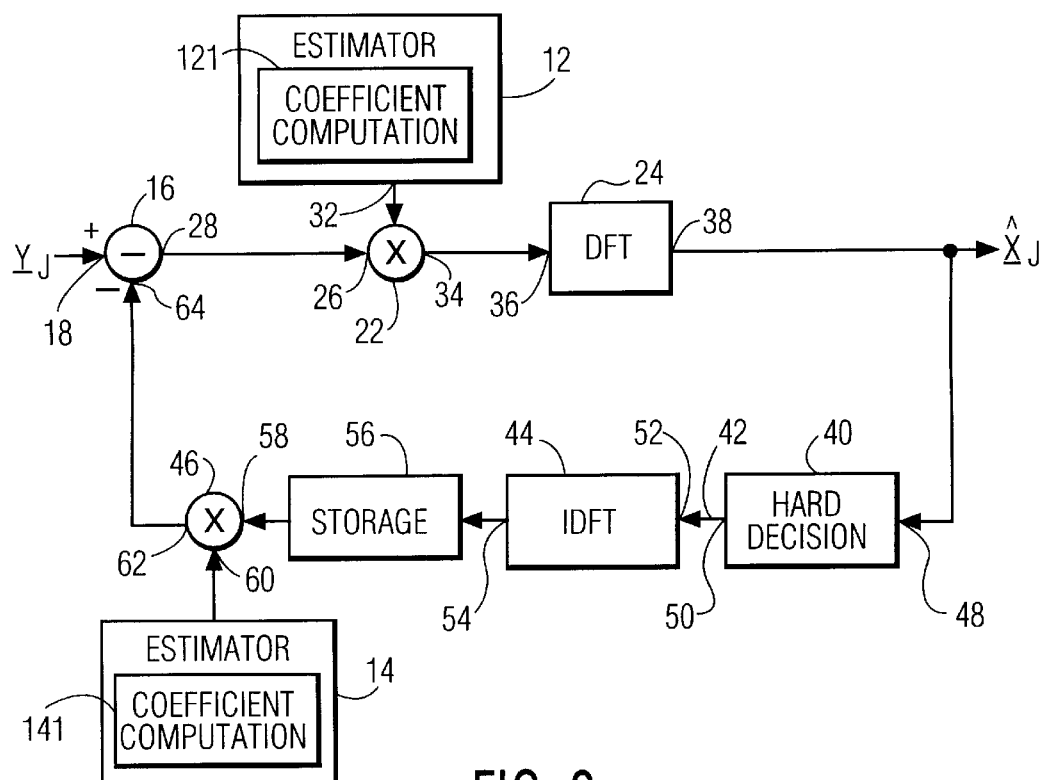

Other characteristics and advantages of the invention will emerge from the following description, taken by way of non-limiting example, with reference to the appended figures, in which:

FIG. 1 schematically represents a structure of an equalizer fitted to the receiver of an OFDM signal transmission device according to the prior art, FIG. 2 schematically represents a structure of an equalizer fitted to the receiver of an OFDM signal transmission device according to the invention.

FIG. 2 schematically illustrates a structure of an equalizer 10 fitted to the receiver of a device for transmitting an OFDM signal formed by a plurality of digital symbols transmitted via a transmission channel, from a transmitter to at least one receiver.

This equalizer 10 is of the recursive vector type and can correct the received signal in the time domain.

The receiver of the transmission device of the invention includes at least two estimators (12, 14) capable of dynamically computing the coefficients of the inverse of the matrix $\underline{H}_0$ and the coefficients of the matrix $\underline{H}_1$. Estimators 12 and 14 include means 121 and 141, respectively, for computing the coefficients of the inverse matrix of a first lower triangular matrix $\underline{H}_0$ and the coefficients of a second upper triangular matrix $\underline{H}_1$.

As can be seen in FIG. 2, the computation means of the equalizer 10 consists on the one hand, of a subtractor 16 having a first input 18 to which the received signal is applied, this subtractor 16 is connected in a forward branch 20, in series with a first multiplier 22 and with a module 24 for discrete Fourier transform computation (DFT), a first input 26 of this first multiplier 22 is connected to the output 28 of the subtractor 16 and a second input 30 of this first multiplier 22 is connected to the output 32 of the first estimator 12 of the inverse of the matrix $\underline{H}_0$, whereas the output 34 of this first multiplier 22 is connected to the input 36 of the module 24 for discrete Fourier transform computation (DFT), an output 38 of which delivers a vector representing a first estimate of the transmitted symbol, and, on the other hand, of a hard decision module 40, arranged in a feedback loop 42, in series with a module 44 for inverse discrete Fourier transform (IDFT) computation and with a second multiplier 46, the input of said hard decision module 40 is connected to the output 38 of the module 24 for Fourier transform computation whereas the output 50 of said hard decision module 20 is connected to the input 52 of the module 44 for inverse discrete Fourier transform computation (IDFT), the output 54 of which is connected via a storage module 56, capable of storing at least one symbol, to a first input 58 of the second multiplier 46, a second input 60 of this second multiplier 46 is connected to the output 62 of the estimator 14 of the matrix $\underline{H}_1$, the output 62 of the second multiplier 46 is connected to a second input 64 of the subtractor 16 and delivers thereto a vector obtained by computing the inverse Fourier transform of the estimated value of the symbol transmitted before, followed by multiplication of this transform by the matrix $\underline{H}_1$.

With a structure of this type, the received signal is equalized according to the following steps:

the vector obtained by computation of the inverse discrete Fourier transform followed by multiplication by the matrix $\underline{H}_1$ of an estimated value of the preceding symbol is subtracted from the vector representing the received symbol, the vector resulting from this subtraction is multiplied by the inverse of the matrix $H_0$, then the Fourier transform of the vector resulting from this multiplication is computed so as to express the corrected symbol in the original frequency domain, the symbol obtained by this Fourier transform is then used to correct the following received symbol, and finally a new estimate is computed of the coefficients of the inverse matrix of $\underline{H}_0$ and the coefficients of the matrix $\underline{H}_1$, the estimated values are stored to correct the following symbol.

According to another characteristic of the invention, in order to estimate the coefficients of the inverse matrix of $\underline{H}_0$ and the coefficients of the matrix $\underline{H}_1$, only the coefficients of the first column of the inverse matrix of $\underline{H}_0$, and the coefficients of the first row of the matrix $\underline{H}_1$, are computed. Its coefficients are calculated by an algorithm generalizing the conventional gradient algorithm used in the equalization of signals modulated by a single-carrier type modulation. Such algorithm is disclosed, for example, in the book *Communication Systems* by Simon Haykin, Chapter 7.9—Adaptive Equalization, pages 452–461.

What is claimed is:

1. Device for transmitting an OFDM signal formed by a plurality of digital symbols transmitted from a transmitter to at least one receiver, via a transmission channel, in which the receiver includes a recursive vector equalizer capable of correcting the received signal in the time domain, wherein the recursive vector equalizer includes computation means capable of estimating each transmitted symbol as a function of an estimate of the transmitted symbol which precedes said transmitted symbol.

2. Device according to claim 1, wherein the receiver includes at least two estimators capable of dynamically computing the coefficients of at least two triangular matrices representing the impulse response of the transmission channel.

3. Device for transmitting an OFDM signal formed by a plurality of digital symbols transmitted from a transmitter to at least one receiver, via a transmission channel, in which the receiver includes a recursive vector equalizer capable of correcting the received signal in the time domain, wherein the recursive vector equalizer includes computation means capable of estimating each transmitted symbol as a function of an estimate of the transmitted symbol which precedes said transmitted symbol; wherein the receiver includes at least two estimators capable of dynamically computing the coefficients of at least two triangular matrices representing the impulse response of the transmission channel; and wherein said estimator includes means for computing the coefficients of the inverse matrix of a first lower triangular matrix Ho and the coefficients of a second upper triangular matrix $\underline{H}_1$.

4. Device for transmitting an OFDM signal formed by a plurality of digital symbols transmitted from a transmitter to at least one receiver, via a transmission channel, in which the receiver includes a recursive vector equalizer capable of correcting the received signal in the time domain, wherein the recursive vector equalizer includes computation means for estimating each transmitted symbol as a function of an estimate of the transmitted symbol which precedes said transmitted symbol; wherein the computation means of the equalizer consists on the one hand, of a subtractor having a first input to which the received signal is applied, this subtractor is connected in a forward branch, in series with a first multiplier and with a module for discrete Fourier transform computation, a first input of this first multiplier is connected to the output of the subtractor and a second input of this first multiplier is connected to the output of the first estimator of the inverse of the matrix $\underline{H}_0$, whereas the output of this first multiplier is connected to the input of the module for discrete Fourier transform computation, an output of which delivers a vector representing a first estimate of the transmitted symbol, and, on the other hand, of a hard decision module, arranged in a feedback loop, in series with a module for inverse discrete Fourier transform computation and with a second multiplier, the input of said hard decision module is connected to the output of the module for Fourier transform computation, whereas the output of said hard decision module is connected to the input of the module for inverse discrete Fourier transform computation, the output of which is connected via a storage module, capable of storing at least one symbol, to a first input of the second multiplier, a second input of this second multiplier is connected to the output of the estimator of the matrix $\underline{H}_1$, the output of the second multiplier is connected to a second input of the subtractor and delivers thereto a vector obtained by computing the inverse Fourier transform of the estimated value of the symbol transmitted before, followed by multiplication of this transform by the matrix $\underline{H}_1$.

5. Method for equalization of an OFDM signal carrying a plurality of digital symbols, each including a number N of complex samples obtained by constellation coding of the signal to be transmitted, each symbol being represented by a vector of N components, this signal is transmitted by a transmitter to at least one receiver, via a transmission channel whose impulse response, previously estimated and stored, is represented by at least two matrices, namely a first lower triangular matrix $\underline{H}_0$ and a second upper triangular matrix $\underline{H}_1$, said method comprising the steps of subtracting, from the vector representing the received symbol, the vector obtained by computation of the inverse discrete Fourier transform followed by multiplication of the matrix $\underline{H}_1$ of an estimated value of the preceding symbol, multiplying the vector resulting from the subtracting step by the inverse of the matrix $\underline{H}_0$, then computing the Fourier transform of the vector resulting from the multiplying step so as to express the corrected symbol in the original frequency domain, using the symbol obtained by this Fourier transform from the computing step to correct the following received symbol, computing a new estimate of the coefficients of the inverse matrix of $\underline{H}_0$ and the coefficients of the matrix $\underline{H}_1$, and storing the estimated values to correct the following symbol.

6. Method according to claim 5, wherein in order to estimate the coefficients of the inverse matrix of $\underline{H}_0$ and the coefficients of the matrix $\underline{H}_1$, only the coefficients of the first column of the said inverse matrix of $H_0$, and the coefficients of the first row of the said matrix $\underline{H}_1$, are computed.

* * * * *